(No Model.)

A. LE GRAND PEIRCE.
BICYCLE PACKAGE CARRIER.

No. 567,159. Patented Sept. 8, 1896.

Witnesses
Samuel S. McLard
H. W. Middlemist

Inventor
Almy Le Grand Peirce,
by Wm L. Pierce,
his Attorney

United States Patent Office.

ALMY LE GRAND PEIRCE, OF PITTSBURG, PENNSYLVANIA, ASSIGNOR, BY MESNE ASSIGNMENTS, TO THE U. S. CYCLE IMPROVEMENT COMPANY, OF SAME PLACE.

BICYCLE PACKAGE-CARRIER.

SPECIFICATION forming part of Letters Patent No. 567,159, dated September 8, 1896.

Application filed September 27, 1895. Serial No. 563,884. (No model.)

*To all whom it may concern:*

Be it known that I, ALMY LE GRAND PEIRCE, a citizen of the United States, residing at Pittsburg, in the county of Allegheny and State of Pennsylvania, have invented or discovered a new and useful Improvement in Bicycle Package-Carriers, of which the following is a specification.

Figures 1, 2:
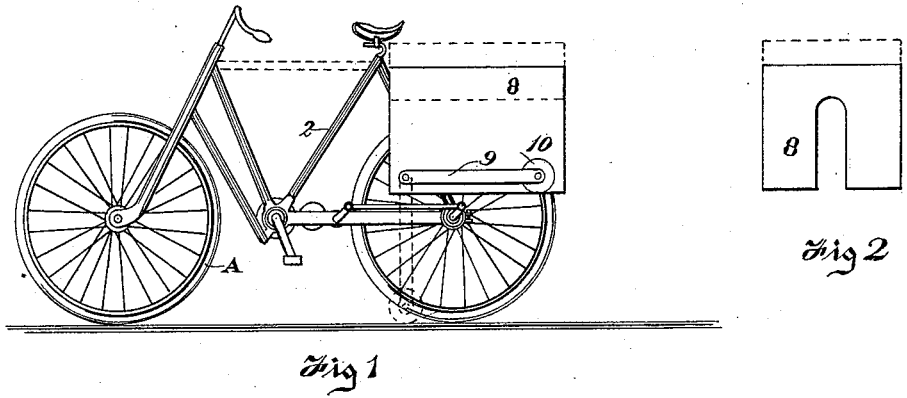
Figures 3, 4:
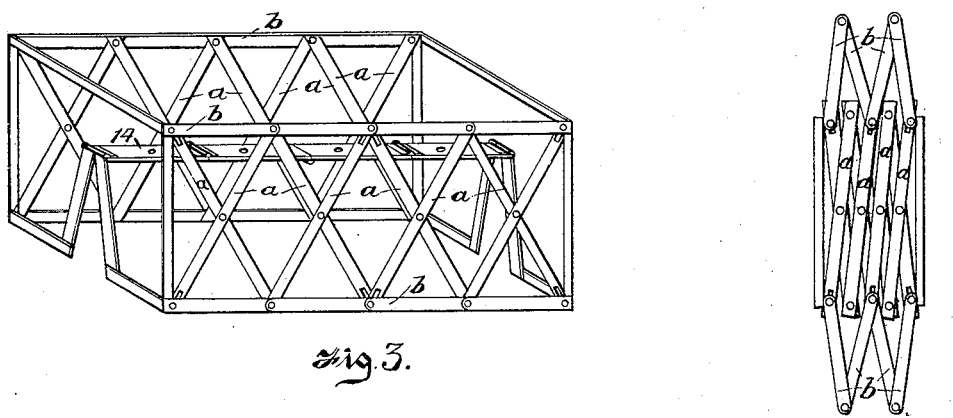
Figures 5, 6, 7:
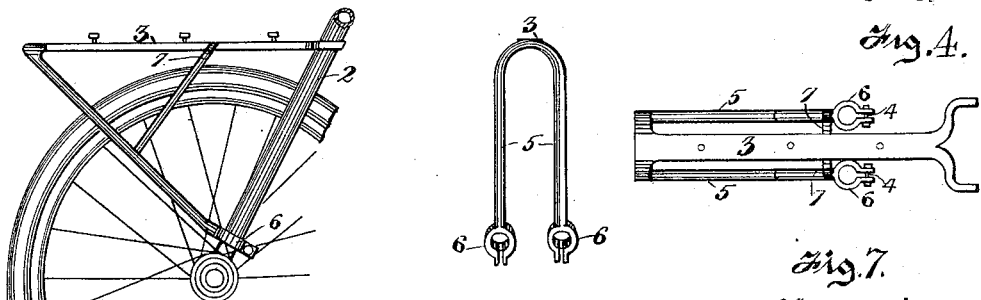

In the accompanying drawings, which make part of this specification, Figure 1 is a side elevation of a bicycle with my improved package-carrier made of veneer or papier-mâché, &c. Fig. 2 is a rear end view of the same. Fig. 3 is a perspective of another modification adapted to be folded longitudinally, as seen in Fig. 4. Fig. 4 is a perspective showing the device folded. Fig. 5 is a side elevation of the supporting-frame for all of these package-carriers. Fig. 6 is a plan of the side bars of this frame, and Fig. 7 of the side bars and central bar of the package-frame.

The ordinary package-carrier now used for velocipedes is only adapted to a tricycle and the entire machine is both cumbrous and expensive.

The purpose of my invention, generally stated, is to provide a package-carrier for bicycles which shall be well balanced, light, out of the way of the rider, and capable of being compactly folded when not in use, so that it will not unnecessarily retard the wheel by exposure to the wind of a large surface.

In the drawings, A is a bicycle of any ordinary construction.

2 2 are the forks extending from the saddle to the bearings of the driving-wheel. Extending rearwardly from said forks 2 2, a little above the level of the wheel, is the central bar 3 of the package-carrier frame. The forward end of bar 3 is forked, as seen in Fig. 7, to span forks 2 2.

Attached to the rear end of bar 3 are two side bars 5 5, running down at an angle of about forty-five degrees and secured to the lower ends of forks 2 2 by clips 6 6 and bolt 4.

7 7 are brace-bars connecting bar 3 and bars 5 5.

8 is the package-carrier itself, which is bifurcated, so as to drop down upon either side of bar 3 and be secured to same by set-screws or in any suitable manner.

9 is a pivoted support having wheel 10, which support can be dropped when the wheel is left standing.

In the construction seen in Fig. 3 the sides are made of jointed lattice-work *a a b b*, and when not in use collapse lengthwise, as seen in Fig. 4. This carrier is also bifurcated and is secured to bar 3 of frame by central bar 14. The central bar 14 is jointed at intermediate points, so that this does not interfere with folding up the carrier.

The open frameworks seen in Figs. 3 and 4 may, if desired, be lined with canvas, rubber, or other light material.

Having described my invention, I claim—

1. The combination of a bicycle; a horizontal support projecting rearwardly from the rear forks of the bicycle-frame; side bars extending from the rear of the horizontal support to the lower ends of said forks and a bifurcated package-carrier adapted to drop down over said horizontal support.

2. The combination of a bicycle; a horizontal support projecting rearwardly from the rear forks of the bicycle-frame; side bars extending from the rear of the horizontal support to the lower ends of said forks; a bifurcated package-carrier adapted to drop down over said horizontal support, and an adjustable prop for said package-carrier when the bicycle is standing.

3. The combination of a bicycle; a horizontal support projecting rearwardly from the rear forks of the bicycle-frame; side bars extending from the rear of the horizontal support to the lower ends of said forks; a bifurcated package-carrier adapted to drop down over said horizontal support and having sides of pivotally-connected open lattice-work and a jointed bottom so that the whole carrier may be collapsed longitudinally when not in use.

In testimony whereof I have hereunto set my hand this 25th day of September, A. D. 1895.

ALMY LE GRAND PEIRCE.

Witnesses:
LUCY DORSEY IAMS,
WM. L. PIERCE.